United States Patent [19]

Guthrie

[11] 4,384,051
[45] May 17, 1983

[54] FLEXIBLE POLYURETHANE FOAM BASED ON MDI

[75] Inventor: James L. Guthrie, Ashton, Md.

[73] Assignee: W. R. Grace & Co., New York, N.Y.

[21] Appl. No.: 314,555

[22] Filed: Oct. 26, 1981

[51] Int. Cl.$^3$ ............... C08G 18/14; C08G 18/32; C08G 18/77
[52] U.S. Cl. .................... 521/137; 521/160; 521/174; 521/901; 521/905; 521/914
[58] Field of Search ............ 521/137, 160, 174, 901, 521/905, 914

[56] References Cited

U.S. PATENT DOCUMENTS

| | | | |
|---|---|---|---|
| 3,890,254 | 6/1975 | Guthrie | 521/905 |
| 3,939,123 | 2/1976 | Matthews et al. | 260/77.5 AM |
| 4,008,189 | 2/1977 | Van Leuwen et al. | 521/905 |
| 4,049,592 | 9/1977 | Marans et al. | 521/905 |
| 4,137,200 | 1/1979 | Wood et al. | 521/905 |
| 4,160,076 | 7/1979 | Guthrie et al. | 521/914 |
| 4,237,240 | 12/1980 | Jarre et al. | 521/159 |
| 4,256,849 | 3/1981 | Ick et al. | 521/160 |
| 4,292,412 | 9/1981 | Wood | 521/905 |
| 4,309,509 | 1/1982 | Wood | 521/905 |
| 4,314,034 | 2/1982 | Fulmer et al. | 521/905 |

FOREIGN PATENT DOCUMENTS

| | | |
|---|---|---|
| 874430 | 8/1961 | United Kingdom. |
| 1209058 | 10/1970 | United Kingdom. |

OTHER PUBLICATIONS

Tech. Service Report, The Upjohn Co., LaPorte, Texas, "Isonate 143L Liquid MDI".
Technical Information, The Upjohn Co., LaPorte, Texas, "PAPI 94".

*Primary Examiner*—H. S. Cockeram
*Attorney, Agent, or Firm*—Edward J. Cabic

[57] ABSTRACT

A flexible hydrophilic MDI based polyurethane foam is produced by mixing together an aqueous phase which can optionally contain reinforcing fibers and surfactants and a resin phase comprising a prepolymer derived from a poly (oxy $C_{2-4}$ alkylene) diol, an MDI containing isocyanate product having a functionality greater than 2.0 made of a mixture of MDI and isocyanate containing derivatives of MDI, and a polymeric poly (oxy $C_{2-4}$ alkylene) polyol cross-linking agent having 3 or 4 hydroxyl equivalents per mole and a molecular weight of at least 500. The preferred polyol is Poly G176-120. The polymeric polyol cross-linking agent is present so the hydroxy equivalents constitute 5 to 35 mole % of the total hydroxy equivalents in the diol and the polymeric polyol while the ratio of the isocyanate equivalents to the total hydroxyl equivalents is in the range of 2.5 to 3.5. The isocyanate containing product comprises less than 50% by weight of the prepolymer and Isonate 143L is the preferred isocyanate product. Flexible foams are obtained which are water-absorbing for medical or personal care applications.

17 Claims, No Drawings

FLEXIBLE POLYURETHANE FOAM BASED ON MDI

CROSS-REFERENCE TO RELATED APPLICATION

U.S. application Ser. No. 314,554 filed Oct. 26, 1981 discloses flexible MDI based polyurethane foams made with monomeric polyols and diols having an average molecular weight greater than 1100.

BACKGROUND OF THE INVENTION

1. Field of the Invention

This invention relates to a polyurethane prepolymer and the resulting flexible foam that can be made from the prepolymer when it is mixed with water.

2. Description of Previously Published Art

Flexible polyurethane foams made with TDI (toluene diisocyanate) have been manufactured for many years, especially for cushion and mattress applications. However, for hydrophilic foams used in medical or personal care applications it is desirable to replace the TDI in the foams with MDI (methylene diphenyl isocyanate) because of the high vapor pressure and relatively high toxicity of TDI which requires special precautionary measures during processing and use. Furthermore, TDI-based foams can be weakened by hydrolysis during sterilization or storage in a wet package. For example, TDI-based hydrophilic foams can liquify after a few minutes in a steam autoclave at 120° C. TDI-based hydrophilic foams also swell excessively when wet such as on the order of more than 100% by volume.

Conventionally polyurethane foams have been made from MDI. These foams are rigid or semi-rigid because MDI imparts crystallinity. in British Pat. No. 874,430, flexible polyurethane foams are produced by reaction of polyether polyols with at least two hydroxyl groups and a polyisocyanate mixture consisting of diarylmethane diisocyanates and 5 to 10 percent by weight of a polyisocyanate having a functionality greater than 2 in the presence of a small amount of water. A catalyst can be used in optional embodiments. These foams have the disadvantages that they are not hydrophilic and are not made with sufficient quantities of water to allow transport of large amounts of fibers, fillers, antiseptics, or other water-dispersible components into foams used in medical or personal care applications. The term hydrophilic as used herein means that the foam product is able to absorb 15-20 times its weight of water. A further disadvantage is that in the case of the optional catalyst there can remain catalyst residue which is not desirable.

In U.S. Pat. No. 4,237,240, flexible MDI-based foams with high load-bearing and high energy-absorption capacity are made by reaction of diphenylmethane diisocyanates with polyester polyols or mixtures of polyester polyols and polyether polyols with a polyester polyol content of at least 60 percent by weight of the polyol mixture, and small amounts of water. As set forth in the claims, a catalyst is employed. These foams have the same drawbacks as those of the above-described British Pat. No. 874,430 including the undesirable catalyst residues in the foam and in addition they require the use of the more expensive polyester polyols.

In British Pat. No. 1,209,058, flexible hydrophilic polyurethane foams can be made by reacting a polyisocyanate with polyether polyols which contain at least 10% by weight of a block copolymer of ethylene oxide capped with propylene oxide to obtain hydrolytic stability. The method requires using at least one divalent tin salt of a fatty acid and/or at least one tertiary amine as a catalyst. The foam products made by this method, while being hydrophilic, have the drawback of being made with only small amounts of water as well as requiring the use of block copolymers. Moreover, there is no teaching of the use of MDI, which is hydrophobic to make hydrophilic foam products and the resulting foam will contain undesirable catalyst residues.

3. Objects of the Invention

It is an object of this invention to provide an improved, flexible polyurethane foam which is made from a prepolymer system containing MDI and its derivatives as the only isocyanate source.

It is a further object of this invention to provide an improved, flexible polyurethane foam which can contain large amounts of fibers, fillers, antiseptics or other water-dispersible components.

It is another object to produce a flexible, hydrophilic foam which is white in color so that it can be used in medical and health care applications.

It is a further object to produce a polyurethane prepolymer having MDI and its derivatives as the only isocyanate source which can be stored for an indefinite period of time and yet when mixed with an approximately equal amount of water will form a hydrophilic foam product. The water can be used as a carrier for water-dispersible ingredients.

It is a further object to produce a polyurethane prepolymer having MDI and its derivatives as the only isocyanate source and which has viscosity stability over time.

It is also an object to produce a polyurethane prepolymer having MDI and its derivatives as the only isocyanate source which has less than 50% by weight of the isocyanate and which will produce a flexible foam.

These and further objects will become apparent as the description of the invention proceeds.

SUMMARY OF THE INVENTION

Flexible foams which are water-absorbing for medical or personal care applications can be made from an isocyanate capped prepolymer by using an MDI derived isocyanate as the sole isocyanate. The foams are made from a prepolymer having at least one poly(oxy $C_{2-4}$ alkylene) containing diol with a relatively low molecular weight of less than 2000 and having at least 50% by weight of oxyethylene groups and preferably at least 80% by weight such as a Carbowax 1000 made by Union Carbide; a polymeric poly (oxy $C_{2-4}$ alkylene) polyol crosslinker having 3 to 4 hydroxyl equivalents per mole with a relatively high molecular weight on the order of at least 500 such as the triol TEP 990, a poly(oxyethylene) triol of approximately 900 molecular weight from Union Carbide or POLY G76-120, an oxyethylene capped poly(oxypropylene) triol of approximately 1400 molecular weight from Olin; and a methylene-bis (phenyl isocyanate), hereinafter MDI, based isocyanate product having a functionality of greater than 2.0 made of a mixture of MDI and isocyanate containing derivatives of MDI such as Isonate 143-L made by Upjohn Polymer Chemicals which has a functionality of approximately 2.1. This formulation produces white foams which are aesthetically pleasing and desirable for medical and health care applications.

One of the key features of the prepolymer formulation is restricting the amount of the isocyanate such as Isonate 143-L so that it is less than 50% and typically about 37-48% of the weight of the prepolymer. The requirement for the isocyanate component is reduced by increasing the average molecular weight of the polymeric polyol crosslinking component so it is greater than 500. When using Carbowax 1000 as the diol which has a molecular weight of about 1000, the preferred polymeric polyol crosslinking agent is Poly G176-120 which is a triol with a molecular weight of about 1400.

The actual content of free MDI can be adjusted up or down in this isocyanate containing product so long as the functionality remains greater than 2.0. For example, additional pure MDI could be added.

DESCRIPTION OF THE PREFERRED EMBODIMENTS

Prepolymers with moderate viscosity and with good viscosity stability can be made with relatively low molecular polyether polyols, an MDI containing isocyanate product such as Isonate 143-L and TMOP as a monomeric crosslinking agent. However, when this prepolymer is mixed with water the foam obtained is typically a white, semi-rigid foam which, while suitable for use as an abrasive sponge, is not suitable for use as a cushion or as a flexible foam. See, for example, U.S. application Ser. No. 314,537 filed Oct. 26, 1981 which is a continuation-in-part of U.S. application Ser. No. 220,562 filed Dec. 20, 1980, now abandoned where MDI containing foams were made with Isonate 143-L, Carbowax 1000, and trimethylolpropane (TMOP) as the crosslinking agent to impart strength to the foam. Since the TMOP has such a low equivalent weight of 44.7, the prepolymer requires large amounts of the isocyanate component, Isonate 143-L, to cap all of the hydroxy groups. The amount of isocyanate is on the order of 50-55% by weight and this makes the foams relatively stiff and hydrophobic.

Prepolymers can also be made with this monomeric cross-linking agent, an MDI containing isocyanate product and a relatively high molecular weight diol as described in U.S. application Ser. No. 314,554 filed Oct. 26, 1981. This prepolymer formulation produces a flexible hydrophilic polyurethane foam. However, in both of these systems the use of a monomeric polyol makes the properties of the resulting foams highly sensitive to the molecular weight of the polyether diols so that viscosities of the prepolymers are excessively high and foams may be stiff and partially crystalline products may result if the molecular weight of the diol is too low.

It has now been discovered that in MDI containing systems using relatively low molecular weight diols having a molecular weight of less than 2000 the isocyanate component can be advantageously reduced by increasing the molecular weight of the polyol crosslinking agent. Instead of using TMOP with a molecular weight of 134, higher molecular weight poly (oxy $C_{2-4}$ alkylene) triols or tetrols are employed which have molecular weights on the order of 500-2000. A preferred example is Poly G175-120 which is a triol with a molecular weight of about 1400. The resulting flexible foams retain their physical properties even when subjected to steam in an autoclave at 120° C. for 5 hours and the foams have a significant decrease in their swell property as compared to TDI foams. TDI based hydrophilic foams swell more than 100% by volume when wet while the present foams swell only from about 30 to 75% when wet.

The reduced percentage of the isocyanate such as Isonate 143-L allows the resulting foams to be flexible and resilient, compared to the foams having an Isonate 143-L content of greater than 50% which are semi-rigid and not resilient. Increases in the molecular weights of the polyol allows for a decrease in the required amount of Isonate 143-L to such an extent that the ratio of isocyanate functional groups to the hydroxyl functional groups (known as the isocyanate index) can be reduced from 3.5/1 to about 3/1, a change which contributes to the flexibility of the foam product. Although flexibility is best characterized by the flexural modulus, the more readily available tensile modulus at 1% elongation has been used as an approximate classification of these foams into soft and flexible (modulus under 20 psi), firm but flexible (modulus between 20 and 40 psi), and semi-rigid (modulus above 40 psi).

The preferred isocyanate containing product having a functionality greater than 2.0, is a mixture of diphenylmethane diisocyanate, MDI, and isocyanate contaning derivatives of MDI. One commercial product meeting this requirement is Isonate 143L which is produced by reacting MDI to form a carbodiimide and this material in turn then reacts to form a tri-functional cycloadduct. The mixture of MDI, the carbodiimide and the cycloadduct are in equilibrium. The mixture contains a major amount of pure diphenylmethane diisocyanate and minor amounts of carbodiimides and trifunctional cycloadducts of diphenylmethane diisocyanate. A mixture of the A and B components below constitute the 143L system.

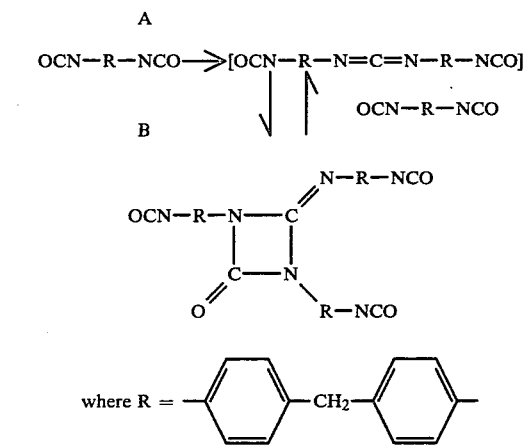

As used herein the term derivatives of diphenylmethane diisocyanate means products that have made from MDI as a starting material. It would include adducts, dimers and trimers. It would not include materials such as polymethylene polyphenylisocyanates which are not made from MDI.

The prepolymer technology for making foams requires mixing with approximately an equal volume of water. This requires the prepolymer to be hydrophilic and it is the reason that at least some poly(oxyethylene) containing diol must be used in making the prepolymer made from the Isonate 143-L. The desirable viscosity for good mixing and foaming with water is in the range of about 10,000-35,000 cp at 25° C., and preferably about 20,000 cp. Both the viscosity and the hydrophilicity of the prepolymers are controlled by the proper choice of polyol type and molecular weight. The prepolymers must not thicken significantly during storage. It has been found that there will be sufficient storage stability if the viscosity does not rise above 100,000 cp (measured at 25° C.) after accelerated storage testing for two weeks at 80° C.

For a flexible foam to be useful in most applications, it should have a tensile strength of at least 20 psi, a foam density of about 3-6 lb/cu. ft., and an elongation at failure of at least 100% with higher values being preferred. In one embodiment an elongation at failure of 250% has been obtained.

The diols to be used are poly (oxy $C_{2-4}$ alkylene) diols having at least 50% by weight oxyethylene groups. Thus when the diol contains oxypropylene or oxybutylene or mixtures thereof, there must also be present this minimum amount of oxyethylene. In the preferred embodiments of this invention, it has been found satisfactory to use as the diols, Carbowax 1000 or Carbowax 1450 manufactured by Union Carbide, although it is within the scope of the invention to use any poly(oxyethylene) diol with a number average molecular weight of 1000-2000, but preferably in the range of 1000-1500.

Although it is within the scope of this invention to use any polymeric polyol as the crosslinking agent, the more preferred are those polymeric poly (oxy $C_{2-4}$ alkylene) polyol crosslinking agents having 3 or 4 hydroxyl equivalents per mole and having a number average molecular weight of at least 500 or mixtures of these polymeric polyols. The most preferred is Poly G76-120 which is a oxyethylene capped poly (oxypropylene) triol of approximately 1400 molecular weight. The oxyethylene moiety here is believed to contain blocks of oxyethylene units attached to a central polyoxypropylene nucleus. It is contemplated that the polyol crosslinker could also consist of a random copolymer of these units.

The density and physical properties of the foam appear to be sensitive to the polyol content. If it is desirable to have a foam with a lower density, but which swells less in water then the amount of the polymeric polyol is increased. Similarly, if it is desirable to have higher density and more elasticity, then the amount of polymeric polyol is decreased. The operable amount of polymeric polyol crosslinking agent having a hydroxy functionality of 3 or 4 is such that 2% to 35% of the hydroxyl content of the diol and polymeric polyol mixture comes from the polymeric polyol. The preferred range for a good flexible foam is 10% to 30% hydroxyl from the polymeric polyol. Generally, a relatively small amount of the polymeric polyol is used to keep the prepolymer fluid. When the amount of polymeric polyol crosslinking agent is expressed with respect to the more plentiful amount of the diol present, the diol and polyol crosslinking agents are present in a mole ratio of about 30:1 to 8:1.

If the molecular weight of the polyol is too high, then the hydroxyl concentration is so low that it takes too long for the starting materials to react. On the other hand, if the molecular weight is too low and low molecular weight diols are employed, then larger amounts of isocyanate are required and stiff foams are produced.

Carbowax 1000 has an equivalent weight of 500 per hydroxyl group while Poly G76-120 with a molecular weight of 1400 has an equivalent weight of 467 per hydroxyl group. Since the Isonate 143L is used to combine with the hydroxyl groups, the amount of the isocyanate required will be very sensitive to the amount of Poly G76-120 and thus the amount of the Poly G76-120 is relatively carefully controlled. The operable amount of Isonate 143-L is such that the isocyanate index is 2.5-3.5, but preferably 2.8 to 3.2 and with very good results at 3.1. Higher ratios allow lower polymer viscosity, lower foam density and less swelling, but they also add cost and reduce softness and elongation. When the prepolymer is made, one isocyanate group of the polyisocyanate component reacts with a hydroxyl group to leave the remaining isocyanate group unreacted. These free isocyanate groups on the prepolymer then react with water to form polyurea linkages with simultaneous increase in molecular weight and the release of $CO_2$ which aids in forming the foamed product.

When reacting the components to form the prepolymer, it has been helpful to measure the isocyanate level by titration after the reaction has taken place for about one hour. From this reading and subsequent titrations one can determine the additional reaction time required to reduce the isocyanate level down to about the level which is the theoretical point at which all of the hydroxyl groups will have reacted with the isocyanate. If the reaction is permitted to continue so the isocyanate level is further reduced, then the prepolymer viscosity increases, making it more difficult to subsequently mix the prepolymer with water. Over reacting the prepolymer components will also cause the foam density to increase as well as to decrease the water adsorptive property of the resulting foam.

Surfactants are chosen to give a foam with a good appearance that has the correct cell size, shape and lack of collapse or splits. Surfactants which are known to be useful in polyurethane foams may be employed here. Examples of preferred surfactants are the block copolymers of oxyethylene and oxypropylene such as the Pluronic Polyol surfactants manufactured by BASF Wyandotte Corp. of Wyandotte, Michigan. A preferred surfactant is Pluronic L-62.

In making the polyurethane foam the preferred procedure is to add about an equal amount of the aqueous suspension with the prepolymer mixture and to then mix the two together. The composition of the aqueous suspension can be also expressed on the basis of 100 parts of prepolymer resin. Thus, 100 parts of water per 100 parts of resin is written 100 phr water. The ratio of the amount of the prepolymer mixture to the aqueous suspension can vary over a wide range. However, if the amount of the aqueous suspension is too large, then the strength of the resulting foam drops. On the other hand if the amount of the aqueous suspension is decreased too much, then it will not be possible to add enough fibers and fillers which are supplied via the aqueous suspension.

The preferred method of foaming the prepolymer is to heat the aqueous suspension, for example, a 2% solution of Pluronic L-62 surfactant, as well as the prepolymer, to a temperature of approximately 35° C. These are poured or pumped together in a ratio of about 100 parts by weight of aqueous suspension to about 80 parts by weight of the prepolymer and stirred immediately for up to 30 seconds by a mechanical stirrer such as a blade attached to a drill motor. This length of time allows complete mixing but does not allow an appreciable degree of chemical reaction to occur. This mixture is poured immediately into a mold, where the rising and curing of the foam product takes place.

Fibers can be added to the aqueous phase for insertion into the foam composition to provide additional structural rigidity. Polyester fibers are especially advantageous and they can be cut up into lengths of about ½ inch or less. With respect to the aqueous suspension the fibers can be added in various amounts although they preferably do not constitute more than about 10% by weight because above that level the suspension becomes too difficult to pump.

A high molecular weight suspending or thickening agent can also be added two functions. First it keeps the ingredients suspended so the water does not drain out of the fibers and so that the fibers do not float. Secondly, the thickening agent acts as a lubricant for the fibers so they do not tangle, dewater and jam up when going through the mixing pump. Examples of thickening agents are Polyox WSR, Natroso, Xanthan gums, and polyacrylamides such as Dow's Separan AP 30 which have high molecular weights of about one million or so.

Preferred suspending or thickening agents are the Carbopol resins made by the B. F. Goodrich Chemical Co. such as Carbopol 934, Carbopol 940 and especially Carbopol 941. Since the Carbopol resins are acrylic acid polymers with an acid moiety, a neutralizing agent such as sodium or ammonium hydroxide can be added. When adding ammonium hydroxide as the neutralizing agent to the Carbopol, there is an advantageous increase in viscosity of the aqueous phase. Also since ammonium hydroxide is less expensive then Carbopol, a more economical formulation having the same amount of thickening can be made which utilizes less Carbopol.

Depending on the amount and nature of the optional fibers, fillers, antiseptics, pigments, thickeners, or other water soluble or water dispersible components which might be incorporated, the best surfactant might vary from a highly hydrophobic silicone type such as L-520 (Union Carbide) or other silicone surfactants to a very hydrophilic type such as Brij-58 (ICI-America) or the other Brij, Span, or Tween products from ICI. For general use, we prefer the nonionic surfactants such as the Pluronics, especially L-62, L-72, L-92, P-75 or P-85 (BASF-Wyandotte). The use of these surfactants would be familiar to one skilled in the formulation of polyurethane foam products.

The water absorption test is conducted by cutting out a rectangular foam sample of dimensions 1×3×5 inches. It is soaked in water and held up until it is no longer dripping. The ratio of the wet weight to the dry weight is the water adsorption ratio.

Having described the basic aspects of our invention, the following examples are given to illustrate specific embodiments thereof.

EXAMPLE 1

A mixture of Carbowax 1000 (412 g, 0.412 mole) and Poly G176-120 (28 g, 0.02 mole) was dried by heating for two hours at 70° C. under a reduced pressure of 2 Torr. To the dried and degassed polyol mixture was added 349 g (2.45 equivalents of isocyanate) of Isonate 143L. The temperature was maintained at 70° C. for 80 minutes to complete the reaction. The product was a light yellow liquid with isocyanate content of 1.96 meq/g and viscosity at 25° C. of 27,000 cp. After storage of a sample for two weeks at 80° C., the product had thickened only to 43,000 cp at 25° C. When 80 g of the product heated at 35° C. was stirred with 100 ml of a 2% solution of Pluronic L-62, a nonionic surfactant from Wyandotte, there resulted a foam with a density of 3.9 lg/ft$^3$ which was soft, flexible, hydrophilic, and with exhibited the properties summarized in Table II.

TABLE I

Prepolymer Composition

| | Examples | | | | |
|---|---|---|---|---|---|
| | 1 | 2 | 3 | 4 | 5 |
| Composition of Diol | | | | | |
| Carbowax 1000 g | 412 | 412 | 412 | — | — |
| Carbowax 1450 g | — | — | — | 438 | 438 |
| Avg. Mol. Wt. | 1000 | 1000 | 1000 | 1450 | 1450 |
| Triol Compound | | | | | |
| Poly G76-120 | 28 | 48 | 67 | 34.5 | 54.8 |
| % Hydroxyl Contributed | 7 | 10 | 15 | 10 | 15 |
| Mole Ratio | | | | | |
| Diol/Triol | 20.6 | 12.0 | 8.6 | 14.0 | 8.5 |
| Isonate 143 L g | 349 | 392 | 437 | 317 | 392 |
| Isocyanate Index | 2.8 | 3.0 | 3.2 | 3.0 | 3.5 |
| Isocyanate Wt. % | 44 | 46 | 48 | 37 | 42 |
| Isocyanate Content meq./g | 1.96 | 2.10 | 2.26 | 1.73 | 2.11 |
| Viscosity at 25° C. | | | | | |
| Initial cp × 10$^{-3}$ | 27 | 20 | 17 | 19 | 12 |
| Aged - 2 weeks at 80° C. cp × 10$^{-3}$ | 43 | 29 | 25 | 37 | 23 |

TABLE II

Physical Properties of Foamed Products

| | Examples | | | | |
|---|---|---|---|---|---|
| | 1 | 2 | 3 | 4 | 5 |
| Density lb/ft$^3$ | 3.9 | 3.5 | 3.1 | 5.7 | 4.1 |
| Tensile psi | 20 | 20 | 20 | 30 | 33 |
| Elongation % | 253 | 195 | 218 | 221 | 203 |
| 1% Modulus psi | 8 | 9 | 10 | 25 | 25 |
| % Volume Swell Wet/Dry | 49 | 34 | 34 | 72 | 44 |
| Compression Set % after 5 hrs. in steam autoclave at 120° C. | 40 | 33 | 37 | — | — |
| Water adsorption ratio | 20 | 18 | 18 | 14 | 16 |

EXAMPLES 2-5

These samples illustrate the foams obtained using different prepolymer compositions. The compositions are given in Table I and the properties of the foams in Table II.

In Example 2, the amount of triole was increased and the isocyanate index was increased in compensation, to give a product with lower viscosity and lower foam density and swelling factor.

In Example 3, the amount of triol and isocyanate were increase further while maintaining good foam properties.

In Example 4, the molecular weight of the Carbowax diol was increased to 1450, allowing the amount of isocyanate to be reduced to only 37% by weight of the total composition while retaining good foam properties.

In Example 5, Carbowax 1450 was used also but the isocyanate index was raised from 3.0 to 3.5 to lower the density of the foam and to improve its swelling factor.

It is understood that the foregoing detailed description is given merely by way of illustration and that many variations may be made therein without departing from the spirit of this invention.

We claim:
1. A flexible polyurethane foam based on methylene diphenyl isocyanate made by mixing together and reacting an aqueous phase and
a resin phase comprising a prepolymer derived from
  (a) a poly(oxy C$_{2-4}$ alkylene) diol having at least about 50% by weight of oxyethylene groups and a nominal number average molecular weight of about less than 2000, said diol having nominally two hydroxyl equivalents per mole, (b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and (c) a polymeric poly(oxy $C_{2-4}$ alkylene) polyol crosslinking agent having 3 or 4 hydroxyl equivalents per mole, and having a number average molecular weight of at least 500 said isocyanate containing product comprising less than 50% by weight of the prepolymer, said polymeric polyol crosslinking agent being present so that the hydroxy equivalents constitute 5 to 35 mole % of the total hydroxy equivalents in the diol and polyol, the ratio of the isocyanate equivalents to the total hydroxyl equivalents being in the range of about 2.5:1 to 3.5:1.

2. A foam according to claim 1, wherein the nominal number average molecular weight of the poly(oxy $C_{2-4}$ alkylene) diol is 600–2000.

3. A foam according to claim 2, wherein the nominal number average molecular weight of the poly(oxy $C_{2-4}$ alkylene) diol is between 950 and 1500.

4. A foam according to claim 1, wherein the poly(oxy $C_{2-4}$ alkylene) diol has at least 80% by weight of oxyethylene groups.

5. A foam according to claim 1, wherein the polymeric polyol crosslinking agent is selected from the group consisting of a poly(oxyethylene) triol having a molecular weight of about 900, and an oxyethylene-capped poly(oxypropylene) triol having a molecular weight of about 1400 and mixtures thereof.

6. A foam according to claim 5, wherein the polymeric polyol crosslinking agent is an oxyethylene-capped poly(oxypropylene) triol having a molecular weight of about 1400.

7. A foam according to claim 6, wherein the polymeric polyol crosslinking agent contains blocks of oxyethylene and oxypropylene units.

8. A foam according to claim 1, further comprising reinforcing fibers.

9. A foam according to claim 8, wherein the reinforcing fibers are polyester fibers of a length of about ½ inch or less.

10. A foam according to claim 9, further comprising a thickening or suspending agent.

11. A prepolymer for use in making a flexible foam comprising the reaction product of (a) a poly(oxy $C_{2-4}$ alkylene) diol having a least about 50% by weight of oxyethylene groups and a nominal number average molecular weight of about less than 2000, said diol having nominally two hydroxyl equivalents per mole, (b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and (c) a polymeric poly(oxy $C_{2-4}$ alkylene) polyol crosslinking agent having 3 or 4 hydroxyl equivalents per mole, and having a number average molecular weight of at least 500 said isocyanate containing product comprising less than 50% by weight of the prepolymer, said polymeric polyol crosslinking agent being present so that the hydroxy equivalents constitutes 5 to 35 mole % of the total hydroxy equivalents in the diol and polyol, the ratio of the isocyanate equivalents to the total hydroxyl equivalents being in the range of about 2.5:1 to 3.5:1.

12. A prepolymer according to claim 11, wherein the molecular weight of the poly (oxy $C_{2-4}$ alkylene) diol is between 600 and 2000.

13. A prepolymer according to claim 12, wherein the nominal number average molecular weight of the poly(oxy $C_{2-4}$ alkylene) diol is between 950 and 1500.

14. A prepolymer according to claim 11, wherein the poly(oxy $C_{2-4}$ alkylene) diol has at least 80% by weight of oxyethylene groups.

15. A prepolymer according to claim 11, wherein the polymeric polyol crosslinking agent is selected from the group consisting of a poly(oxyethylene) triol having a molecular weight of about 900, an oxyethylene-capped poly (oxypropylene) triol having a molecular weight of about 1400 and mixtures thereof.

16. A prepolymer according to claim 15, wherein the polyol crosslinking agent is an oxyethylene-capped poly (oxypropylene) triol having a molecular weight of about 1400.

17. A prepolymer according to claim 16, wherein the polyol crosslinking agent contains blocks of oxyethylene and oxypropylene units.

* * * * *